(12) United States Patent
Green et al.

(10) Patent No.: US 6,287,414 B1
(45) Date of Patent: *Sep. 11, 2001

(54) COLLAPSIBLE ROTARY BLISTER SEALER WITH IMPROVED HEATING PLATE ASSEMBLY

(76) Inventors: Robert Green; Greg L. Wawrzyniak, both of 9245 Dowdy Dr. #112, San Diego, CA (US) 92126

( * ) Notice: Subject to any disclaimer, the term of this patent is extended or adjusted under 35 U.S.C. 154(b) by 0 days.

This patent is subject to a terminal disclaimer.

(21) Appl. No.: 09/378,974

(22) Filed: Aug. 23, 1999

Related U.S. Application Data (63) Continuation-in-part of application No. 08/746,298, filed on Nov. 8, 1996, now Pat. No. 5,997,688.

(51) Int. Cl.⁷ ........................................... B30B 15/00
(52) U.S. Cl. ..................... 156/583.1; 156/539; 156/580
(58) Field of Search ..................... 156/538, 539, 156/556, 580, 583.1

(56) References Cited

U.S. PATENT DOCUMENTS

| | | | |
|---|---|---|---|
| 4,273,607 | * 6/1981 | Paul | 156/540 |
| 4,352,712 | * 10/1982 | Paul | 156/540 |
| 4,353,775 | * 10/1982 | Paul | 156/540 |
| 5,261,997 | * 11/1993 | Inselmann | 156/580 |
| 5,997,688 | * 12/1999 | Wawrzyniak | 156/583.1 |

* cited by examiner

Primary Examiner—James Sells
(74) Attorney, Agent, or Firm—Steins & Associates (57) ABSTRACT

A Collapsible Rotary Blister Sealer with Improved Heating Plate Assembly is disclosed. The disclosed blister sealer comprises a lightweight, tubular frame, detachable legs and a lightweight, modular turntable. Further disclosed is a sealer that is mountable on a table-top or other horizontal surface. Said disclosed turntable is height-adjustable; easily removable, and further includes an indexing means for stopping said turntable at predetermined angular positions. The disclosed press of the present blister sealer may be height- and pressure-adjustable, and said frame may further include a strut to further strengthen said frame when greater pressures are desired from said press. It is further disclosed that said sealer include a unique heater plate assembly that permits easy access to the heating coils and further may include a protective sheath to prevent damage to said heater plate assembly. Still further disclosed is a protective guard to protect the user from the heater plate assembly by a guard comprising a metal top and three plastic side panels that are easily replaceable. In a further embodiment of the present invention, a rotary collapsible blister sealer that can seal clamshell packages around items is also disclosed.

18 Claims, 9 Drawing Sheets

COLLAPSIBLE ROTARY BLISTER SEALER WITH IMPROVED HEATING PLATE ASSEMBLY

This application is a continuation-in-part of application Ser. No. 08/746,298, filed Nov. 8, 1996; U.S. Pat. No. 5,997,688.

BACKGROUND OF THE INVENTION

1. Field of the Invention

This invention relates generally to blister sealers and, more specifically, to a Collapsible Rotary Blister Sealer with Improved Heating Plate Assembly.

2. Description of Related Art

Blister packaging has become one of the most prevalent means for packaging small- to medium-sized items for retail sale. A blister package comprises a backing card, many times made from cardboard, with designs or other information labeled thereon; a clear plastic "blister" is then sealed (over the retail item) to the backing card. These blister packages are extremely convenient and cost-effective and are particularly well-suited for hanging from the backing card. These backing cards may also be made from plastic, with a paper or cardboard insert placed in the blister with the retail item.

Prior blister sealers are adequate for the sealing task. They generally comprise at least one nesting tray on which the blisters are staged facing back-side up (i.e. the inside of the blister is up). The retail items are then placed on top of the blister (i.e. inside of it), with the face-down backing card then being laid atop the blister. The nesting tray is then placed under a heated plate; the heated plate is pressed down upon the back of the backing card for the requisite amount of time, which causes the blister to bond to the backing card, usually by melting a special bonding agent previously applied to either the backing card or the blister.

These prior blister sealers are generally very large machines that have more than one work station, typically arranged about a rotatable turntable, such that one set of parts can be staged by one employee coincident with the sealing of another set of parts by another employee. The problem with these large machines is that they are not a feasible purchase for a business having medium- to low-volume packaging needs. For one thing, they are prohibitively expensive; they are also so big that they consume excessive shop space. Furthermore, they are extremely difficult to ship, move or relocate. What is needed is a compact, lightweight blister sealer that can handle low- to medium-work flow. Also, if the unit had detachable legs, such that the unit could not only be easily shipped, but also placed on an existing table-top, the unit would be even more beneficial.

Another difficulty with the prior blister sealers is the design of the turntable. The typical prior turntable is a solid circular board or sheet with apertures cut therein for receiving the nesting trays. When it is necessary to conduct periodic maintenance or repairs, it is extremely difficult to remove these turntables, because of their extreme weight and size, as well as the fact that they are not designed to be easily removed. What is needed is a rotary blister sealer that includes a light-weight, quickly-detachable turntable, to facilitate maintenance on the unit. If the turntable was also collapsible, it would be of farther benefit, particularly if the unit was to be shipped to another location.

Another important part of the blister sealer is the heating plate assembly. The typical prior heating plate assembly comprises a solid metal block, through which passages are drilled. Electric heating coils are then inserted into the passages; when the coils are heated, the block will heat by conduction. One problem with this prior design relates to the need for maintenance on the heater; if a coil fails, many times the entire heating block must be discarded or sent out for repair. If the heating plate assembly included provisions for easy access to the heating coils in the event of coil failure, the user could easily complete repairs without the need to send the heater out for special help.

A further problem with the prior heating plate assembly is that of wear to the face of the heating plate. It is fairly common that the face of the heating plate becomes fouled or otherwise damaged through prolonged use. The prior heating plate assembly must be completely replaced in such an event, creating excessive delays and expense. If there were some sort of shield over the face of the heating plate that could be easily and cheaply replaced when it became worn or damaged, there would be no need to dismantle the entire heating plate assembly for repairs; this would be very helpful.

Another drawback of the prior blister sealers relates to control of the turntable positioning. The typical prior (manual) blister sealer doesn't have any sort of stopping or indexing system for stopping the turntable when a freshly loaded nesting tray is in position for pressing. As a result, misalignments and/or delays may occur while proper positioning is achieved. If the turntable included a series of stops, such that it simply needs to be rotated until a stop is encountered in order to be in correct alignment with the press, it would greatly facilitate the blister sealing process.

The blister sealing process and equipment is closely related to another process, known as "clamshell packaging". The clamshell package is plastic on the front and back side of the packaged item. The conventional manufacturing process creating the clamshell package involves gluing or sealing the edges of the two plastic halves to one another. The conventional clamshell packaging equipment suffers from the same defects as the conventional blister sealing equipment, namely, its extreme bulkiness and high cost. What is needed is a low-cost, collapsible, rotary blister sealer for creating clamshell packages.

SUMMARY OF THE INVENTION

In light of the aforementioned problems associated with the prior devices, it is an object of the present invention to provide a Collapsible Rotary Blister Sealer with Improved Heating Plate Assembly. The blister sealer comprises a lightweight, tubular frame, detachable legs and a lightweight, modular turntable. It is a further object that the blister sealer be mountable on a table-top or other horizontal surface. Said turntable should be height-adjustable; easily removable, and further inched an indexing means for stopping said turntable at predetermined angular positions. The press of the present blister sealer should be height- and pressure-adjustable, and said frame may further include a strut to further strengthen said frame when greater pressures are desired from said press. It is a further object that said sealer include a unique heater plate assembly that permits easy access to the heating coils and further may include a protective sheath to prevent damage to said heater plate assembly. It is a still further object that the user be protected from the heater plate assembly by a guard comprising a metal top and three plastic side panels that are easily replaceable. It is a further object that the present invention provide a rotary collapsible blister sealer that can seal clamshell packages around items.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Collapsible Rotary Blister Sealer with Improved Heating Plate Assembly.

Figure 1:
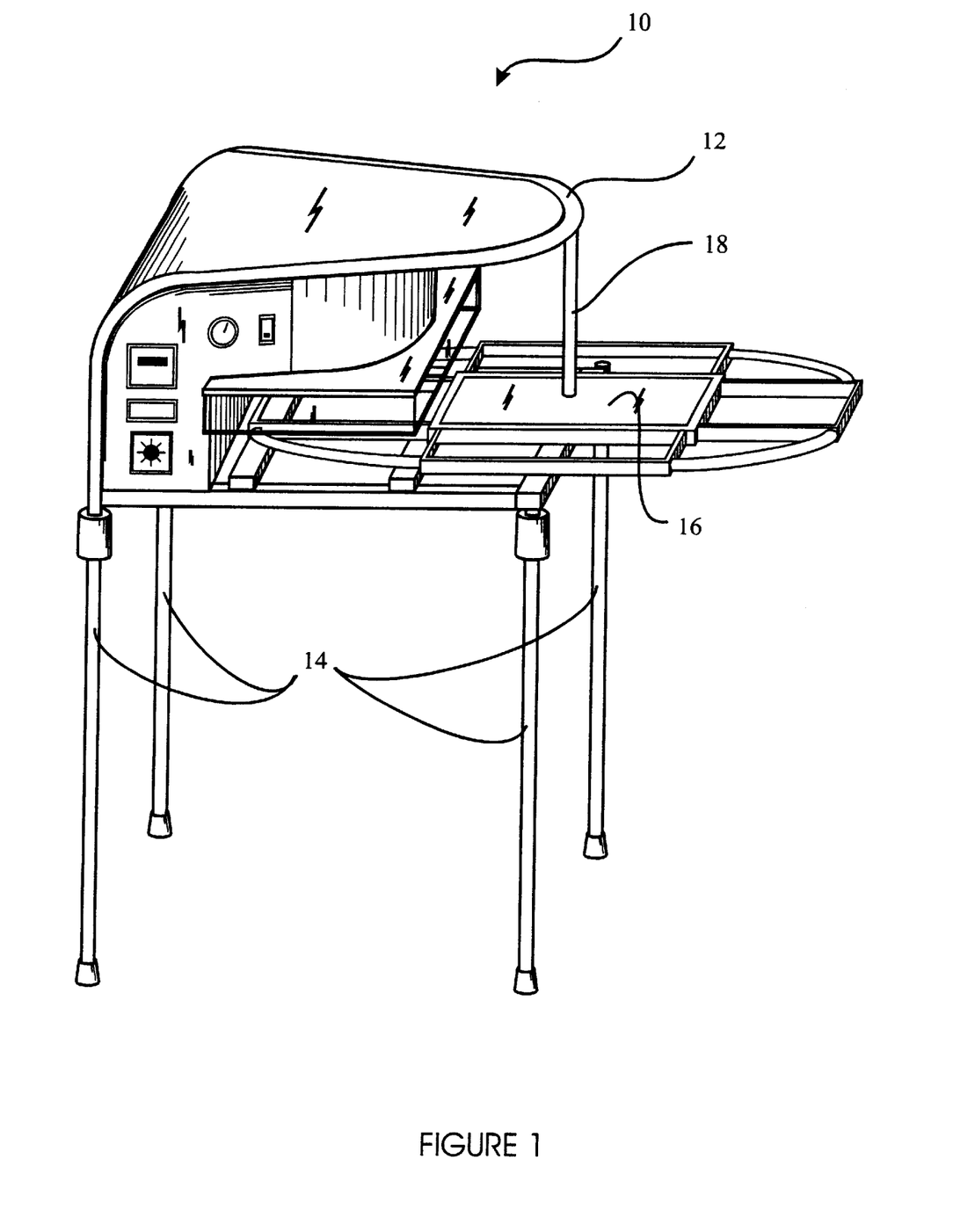
FIG. 1 is a perspective view of a preferred embodiment of the present invention.

The present invention can best be understood by initial consideration of FIG. 1. FIG. 1 is a perspective view of a preferred embodiment of the rotary blister sealer 10 of the present invention. As can be seen, the rotary blister sealer 10 comprises a frame 12 which is supported by legs 14. In a preferred form, the frame 12 and legs 14 are made from rectangular and/or circular tubing, such as from steel, aluminum or other strong, lightweight material; other cross-sections may be used, depending upon the application involved. The legs 14 may be quickly detached from the frame 12 if it desirable to place the sealer 10 on a raised horizontal surface, or for shipping or moving, for example.

Also shown in FIG. 1 is a preferred turntable 16. Ideally, the turntable 16 will be lightweight, such as from aluminum or other type of tubing. Furthermore, the preferred turntable 16 will be removable and be constructed in a modular manner, such that it may be dismantled or collapsed when desired. A strut 18 is shown in FIG. 1 protruding upwardly through the turntable 16 and to the upper portion of the frame 12. This strut 18 is an optional element that may be desired for further rigidity to the sealer 10, particularly where greater pressing forces are used in the sealing process. As might be appreciated, the turntable 16 is easier to remove from a sealer 10 that does not include the strut 18, and therefore both embodiments are disclosed. Further detail regarding each structure is provided below in connection with the other drawings and the Provisional Application Ser. No. 60/006,356, filed Nov. 8, 1996, incorporated herein by reference.

Figure 2:
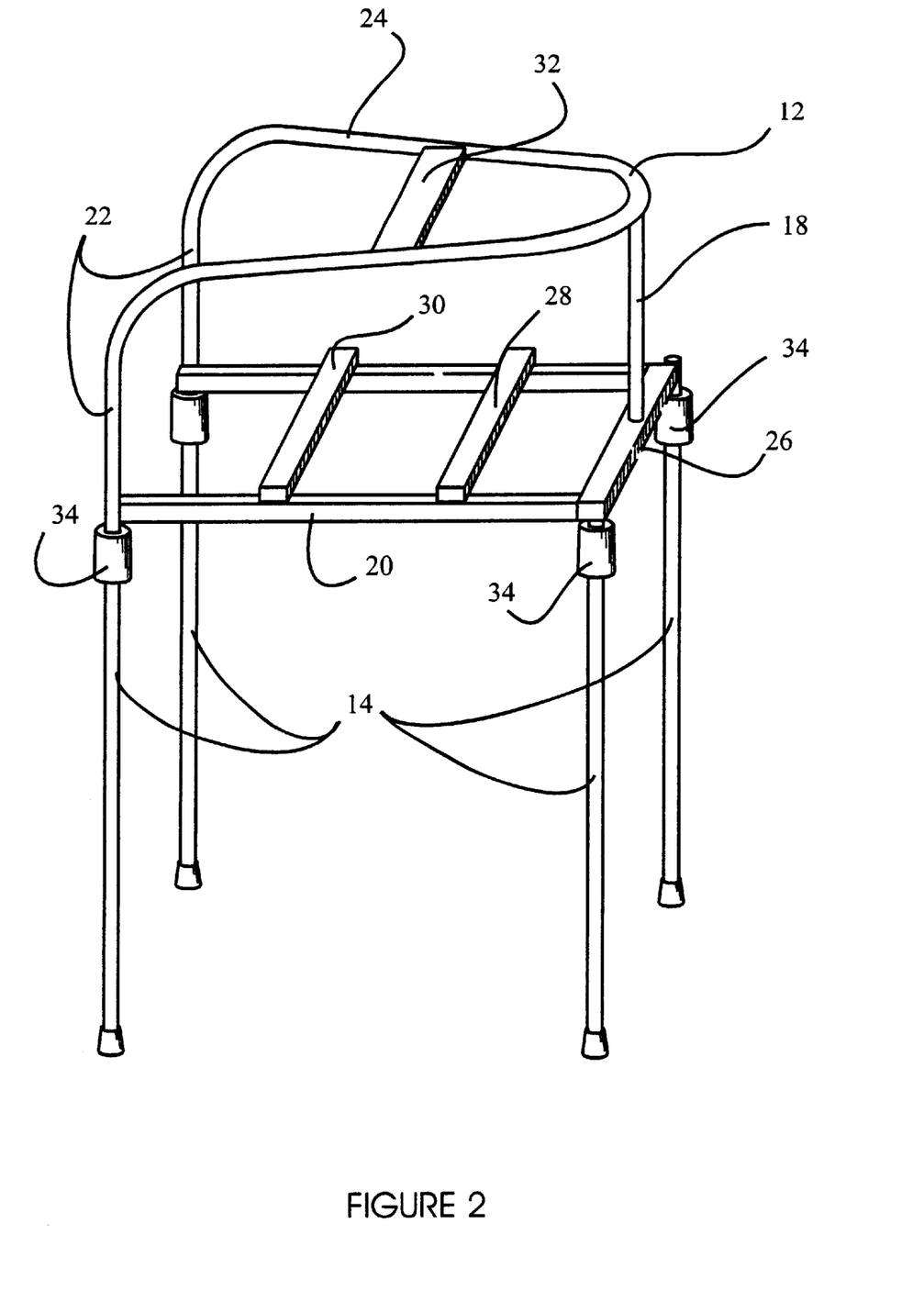
FIG. 2 is a perspective view of the embodiment of FIG. 1 showing the Frame and Legs.

If we turn now to FIG. 2, we might gain a better understanding of the frame 12 and legs 14. FIG. 2 is a perspective view of the embodiment of FIG. 1 showing only the frame 12, legs 14 and strut 18. As can be seen, the frame 12 comprises a base portion 20, a back portion 22, and a top portion 24. In this example, the base portion 20 is constructed substantially from tubing of a rectangular cross-section, however other shapes may be used, depending upon the application. The back portion 22 and the top portion 24 comprise tubing of a circular cross-section, such as from steel or other metal; again, other strong, lightweight materials and cross-sections may be used.

The base portion 20 further comprises a center brace 26, a medial brace 28 and a outer brace 30. The function of the center brace 26 is to strengthen the base portion 20 in the area of the turntable (see FIG. 1). The medial brace 28 may include a guide (not shown) on its top surface, upon which the turntable (see FIG. 1) may rest. The guide (not shown) may be made from some sort of plastic or other material that will permit the turntable (see FIG. 2) to slide over it without wearing either the turntable (see FIG. 1) or the medial brace 28. The outer brace 30 is very similar to the medial brace 28, but is positioned at or near a location that corresponds to the periphery of the turntable (see FIG. 1). The outer brace 30 may also include a guide upon which the turntable (see FIG. 1) may rest and slide. The center brace 26, medial brace 28 and outer brace 30 are preferably made from a lightweight, strong material and are rigidly attached to the frame 12 by a conventional means that may or may not permit removal of each piece when collapsing the sealer (see FIG. 1).

The top portion 24 may include a top brace 32, which is configured to support the press assembly (see FIG. 3) and to provide further rigidity to the frame 12. The top brace 32 is rigidly attached to the top portion 24 by a conventional means, such as welding or bolting, that also may or may not permit its removal in order to collapse the sealer (see FIG. 1).

Each leg 14 is preferably removeably attached to the frame 12, such as by insertion into a leg receiver 34. Each leg receiver 34 might include a set screw (not shown) which can be tightened onto a leg 14, to retain the leg 14 once it is inserted into the leg receiver 34. In this manner, the legs 14 can be removed simply by first removing the set screws (not shown) and then sliding the legs 14 out of the leg receivers 34.

Figure 3:
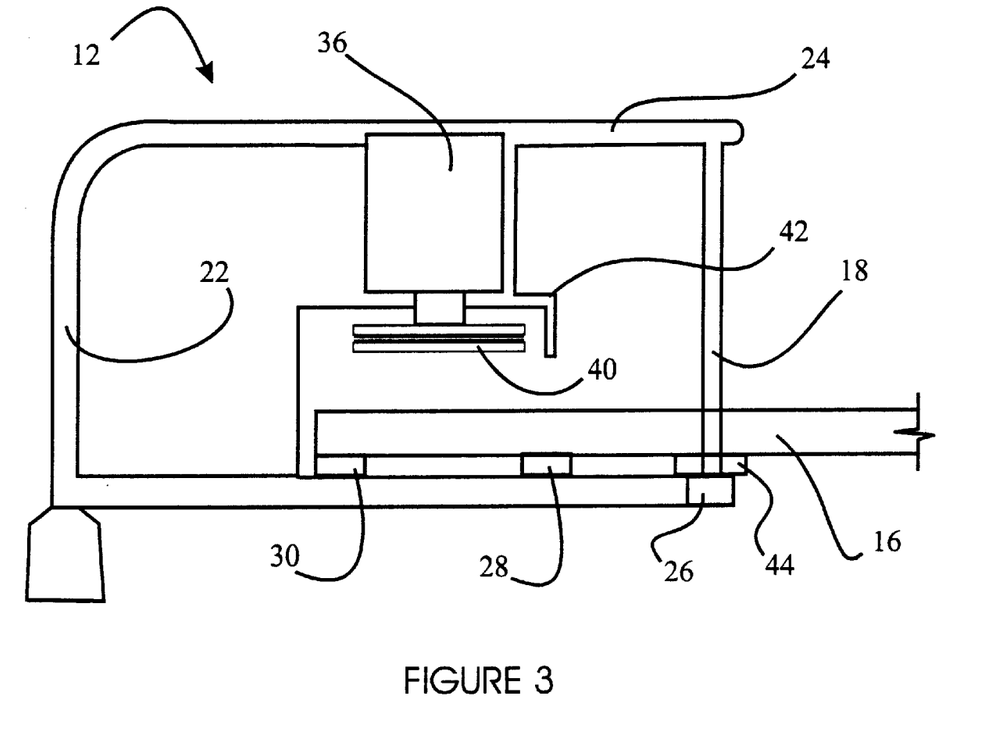
FIG. 3 is a cutaway side view of the Frame of the embodiment of FIG. 1.

In order to understand the cooperation of the press 36 and turntable 16, one should now consider FIG. 3. FIG. 3 is a cutaway side view of the Frame 12 of the embodiment of FIG. 1. As described above, the press 36 is preferably attached to the top brace (see FIG. 2), and further includes a shaft 38 that is extended and retracted by the press 36. The press 36 may be operated to extend and retract the shaft 38 by electrical, pneumatic, hydraulic, magnetic or other means well known in the art.

Attached to the distal end of the shaft 38 is the heating plate assembly 40. Further detail regarding the heating plate assembly 40 may be found below in connection with the discussion under FIGS. 5 and 6. As may be appreciated, therefore, when the shaft 38 is extended, the heating plate assembly 40 is biased towards the turntable 16, where backing cards and blisters to be sealed would rest. As also can be seen, the medial brace 28 and outer brace 30, and their respective guides (not shown) are aligned such that they straddle the width of the heating plate assembly 40 when the heating plate assembly 40 is lowered onto the turntable 16. The present invention may also permit the stroke of the shaft 38 and/or the height of the heating plate assembly 40 to be adjusted by the user to allow for different nesting tray and packaging configurations.

In its preferred form, the heating plate assembly 40 is surrounded on its sides by a guard 42. This guard 42 may be in a variety of styles, with a preferred form including a sheet metal top with three strips of shatter-resistant plastic surrounding it on the three exposed sides. This design is particularly efficient, because it permits the easy and cheap replacement of individual plastic strips (rather than the entire guard 42) in the event that the guard 42 is damaged in some way.

Also shown in FIG. 3 is an indexing means 44. The indexing means 44 provides a positive stop to the rotation of the turntable 16 when a nesting tray (see FIG. 4) is aligned properly for pressing/heating. The indexing means 44 may allow for some adjustment of the angular position of each stop, to allow for operator adjustment for special nesting trays (see FIG. 4), for example. Further detail regarding the indexing means 44 may be found below in connection with the discussion under FIG. 7.

Figure 4:
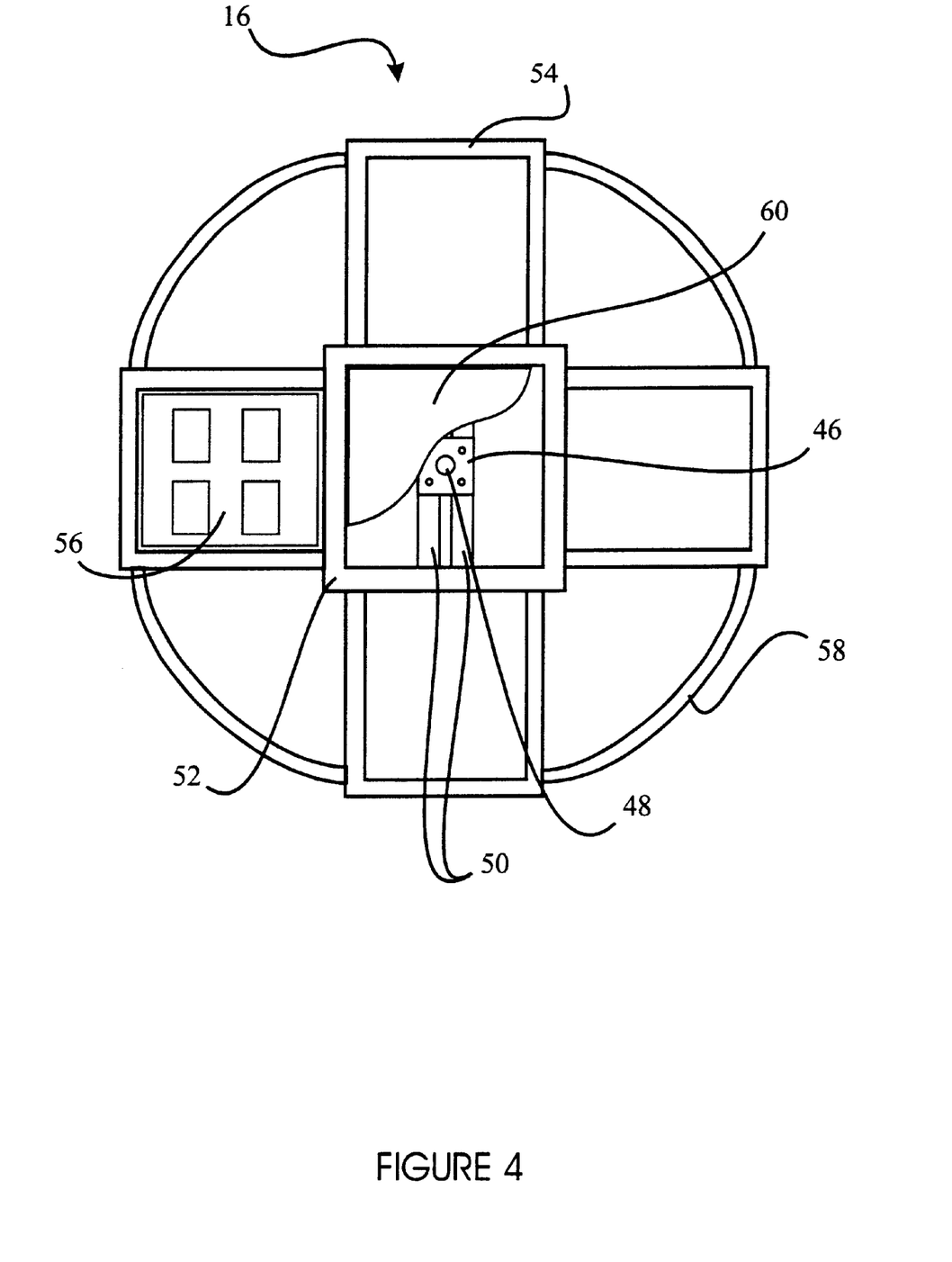
FIG. 4 is a top view of a preferred Turntable of the present invention.

FIG. 4 provides additional detail regarding the preferred turntable 16. FIG. 4 is a top view of a preferred turntable 16 of the present invention. In the center of the turntable 16 is a block 46, preferably from a light-weight, strong material, such as steel. In the center of the block 46 is a center aperture 48, through which the strut (see FIGS. 1, 2 and 3) may pass, if so equipped. If no strut is included in the particular embodiment, the center aperture 48 may be excluded. Centered on the block 46 and extending away therefrom may be a pair of mounting bars 50, for rigidly attaching the turntable 16 to the block 46.

Attached to the mounting bars 50, and surrounding the block 46 is the center panel frame 52, which is the base structure to which the nesting tray receiver members 54 attach. Each nesting tray receiving member 54 may be configured to be removable from the center panel frame 52, thereby making the turntable 16 collapsible; one preferred means of attachment is by conventional bolts, etc. A preferred material of construction for the center panel frame 52 and the nesting tray receiving members 54 is rectangular tube, such as from steel or other lightweight, strong material. The aperture formed by the cooperation of each nesting tray receiving member 54 and the center panel frame 52 is ideally formed to receive a nesting tray 56. These nesting trays 56 are old in the art and comprise a flat sheet with apertures therethrough to receive a specific shape of blister. Each aperture may also have some sort of gasket surrounding it to assist in the sealing process, and the sheet may also include some alignment pegs to align the backing cards with the blisters.

In its preferred form, adjacent nesting tray receiver members 54 are connected to one another by an handle 58. The preferred handles 58 comprise a smooth, lightweight material, such as tubing, bolted to the nesting tray receiving members 60, such that they are also removable. These handles 58 assist an operator in turning the turntable 16 to advance the nesting trays 56 to the next set of items to be sealed.

In the center of the turntable 16, a center panel 60 may cover the open area in the center of the center panel frame 52. The center panel 60 provides a flat surface upon which operators may stage parts for sealing, such as backing cards, blisters, and the retail items. If a strut (see FIGS. 1, 2 and 3) is included, the center panel 60 will include an aperture (not shown), corresponding to the center aperture 48, through which the strut may pass. If no strut is included, the center panel 60 surface is undisturbed for part staging.

Figure 5:
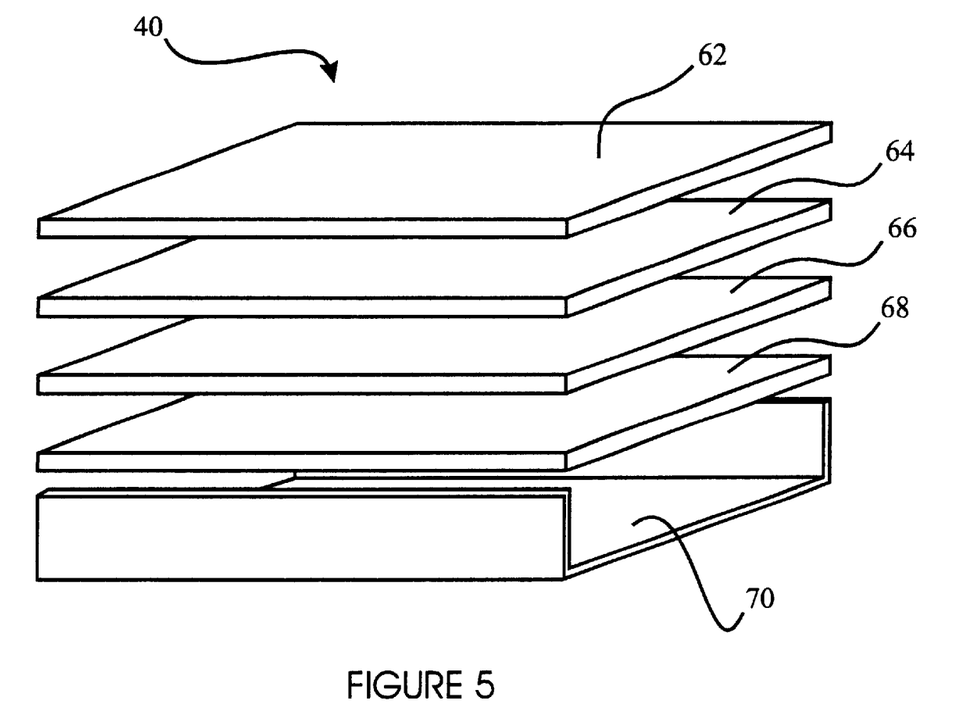
FIG. 5 is an exploded perspective view the structural layers of a preferred Heating Plate Assembly of the present invention.

FIG. 5 presents another unique aspect of the present invention. FIG. 5 is an exploded perspective view the structural layers of a preferred heating plate assembly 40 of the present invention. As can be seen, a base plate 62, preferably made from aluminum, is attached to the distal end of the shaft (see FIG. 3). Below the base plate 62 may be a reflective layer 64, for reflecting heat energy away from the base plate 62. The reflective layer 64 may or may not be included in all embodiments, depending upon the particular application involved.

Below the reflective layer 64 is an insulating layer 66. The material comprising the insulating layer 66 may be any of several conventional insulating materials. Below the insulating layer 66 is the outer plate 68. The outer plate 68 is preferably very similar to the base plate 62. All of the aforementioned layers are pressed and held together, such as by bolts. In one preferred form, a shield 70 may be attached to the heating plate assembly 40 to cover the outer plate 68. The shield 70 may be a thin metallic layer that is heat-resistant and possibly even including a coating, such as a non-stick material, on its outer surface. The role of this shield 70 is to protect the outer plate 68 from damage which may result through prolonged use of the heating plate assembly 40. The shield 70 is designed to be easily removable and replaceable for periodic or corrective maintenance.

Figure 6:
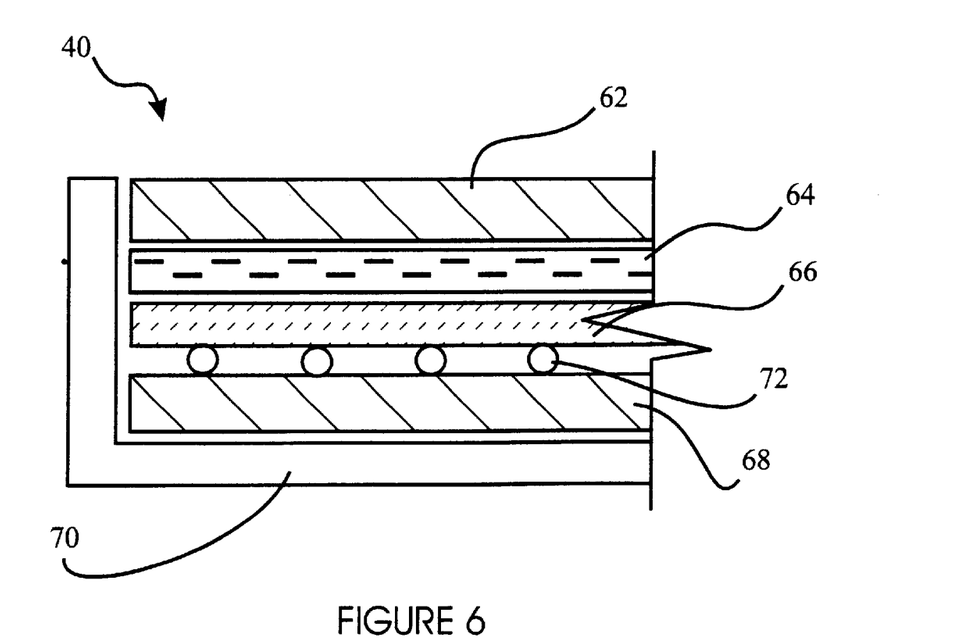
FIG. 6 is a partial cutaway of the Heating Plate Assembly of FIG. 4.

FIG. 6 gives indicates how the improved heating plate assembly 40 appears when it is assembled. FIG. 6 is a partial cutaway of the heating plate assembly 40 of FIG. 4. As can be seen, heating coils 72 are pressed between the insulating layer 66 and the outer plate 68. When connected to an electrical power source, the heating coils 72 will heat up and subsequently cause the outer plate 68 (and shield 70, as appropriate) to heat up by conduction. Since the heating coils 72 are not embedded within the outer plate 68, if any of the coils fail they can be easily repaired or replaced by removing the outer plate 68 (and shield 70, as appropriate).

Figure 7:
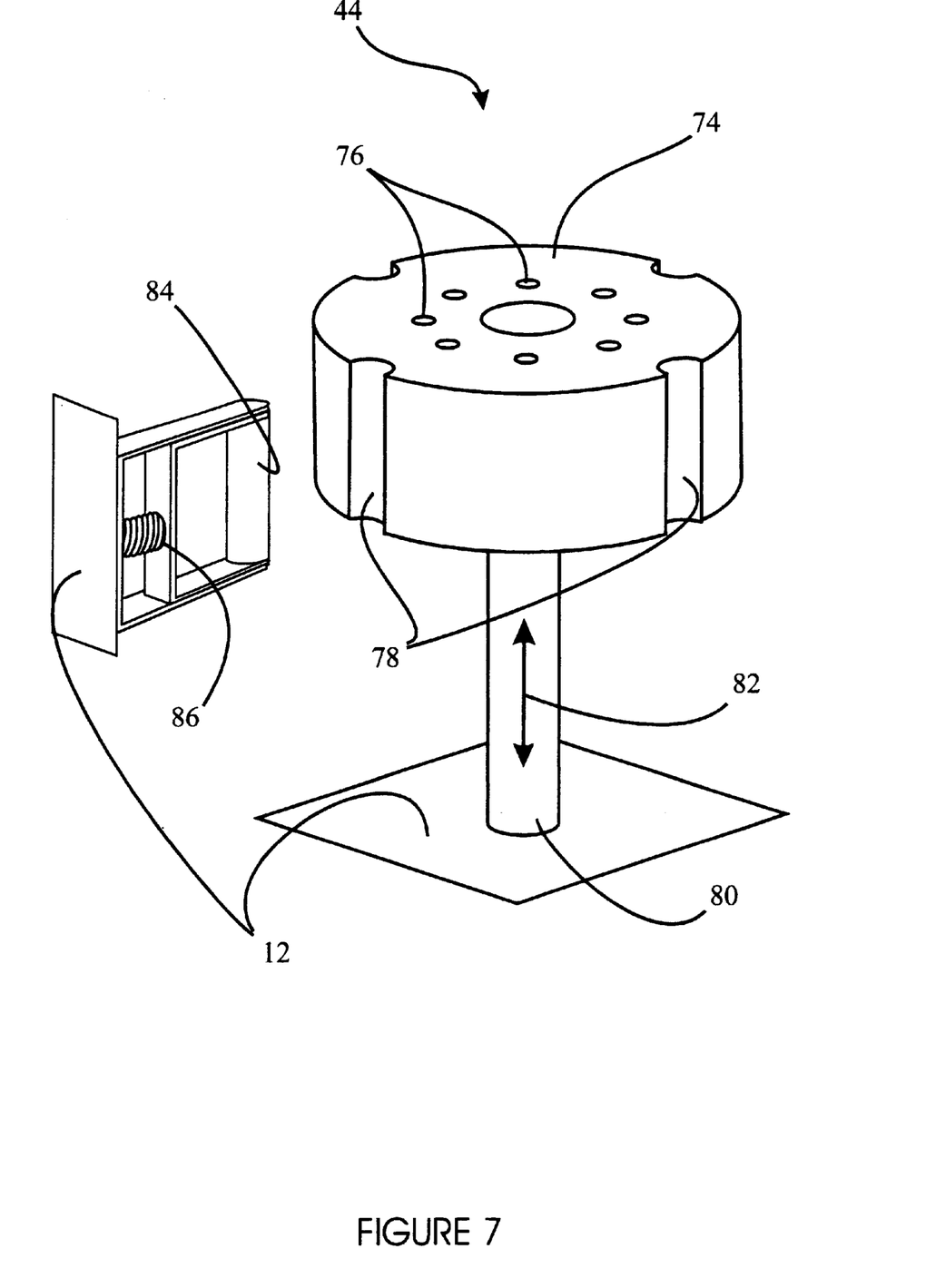
FIG. 7 is an exploded perspective view of a preferred Indexing Means of the present invention.

Another unique aspect of the present invention may be appreciated by consideration of FIG. 7. FIG. 7 is an exploded perspective view of a preferred indexing means 44 of the present invention. In one form, the indexing means 44 comprises an index disc 74, which is attached to the underside of the turntable (see FIGS. 1, 2 and 3) at the block (see FIG. 4) via the apertures 76. The index disc 74 may be made from a variety of materials, including high-density plastic, and includes a plurality of depressions 78 formed around its circumference. The index disc 74 is permitted to rotate on the spindle 80 which passes through its center and is attached to the center brace (see FIG. 2). The spindle 80 and/or index disc 74 may be adjustable in the direction 82, such that the height of the turntable (see FIGS. 1, 2 and 3) will also be adjustable.

Cooperating with the indexing disc 74 is a roller cam 84, that is also slidingly mounted to the frame or center brace (see FIG. 2), such that the roller cam 84 may travel towards and away from the center of the index disc 74. A biasing means 86, such as a conventional spring, biases the roller cam 84 towards the index disc 74. In operation, therefore, the roller cam 84 travels over the index disc 74 as the index disc 74 is rotated on spindle 80. When the roller cam 84 encounters a depression 78, it will be biased into it, thereby causing a positive stop on the index disc 74 and, consequently, the turntable (see FIGS. 1, 2 and 3). One need merely to exert slightly more angular force on the turntable (see FIGS. 1, 2 and 3) to overcome the force of the biasing means 86 and force the roller cam 84 out of the depression 78. Either the alignment of the index disc 74 and/or the positioning of the roller cam 84 may be adjustable by the user in order to change the angular location of each stop, if desired.

Figure 8:
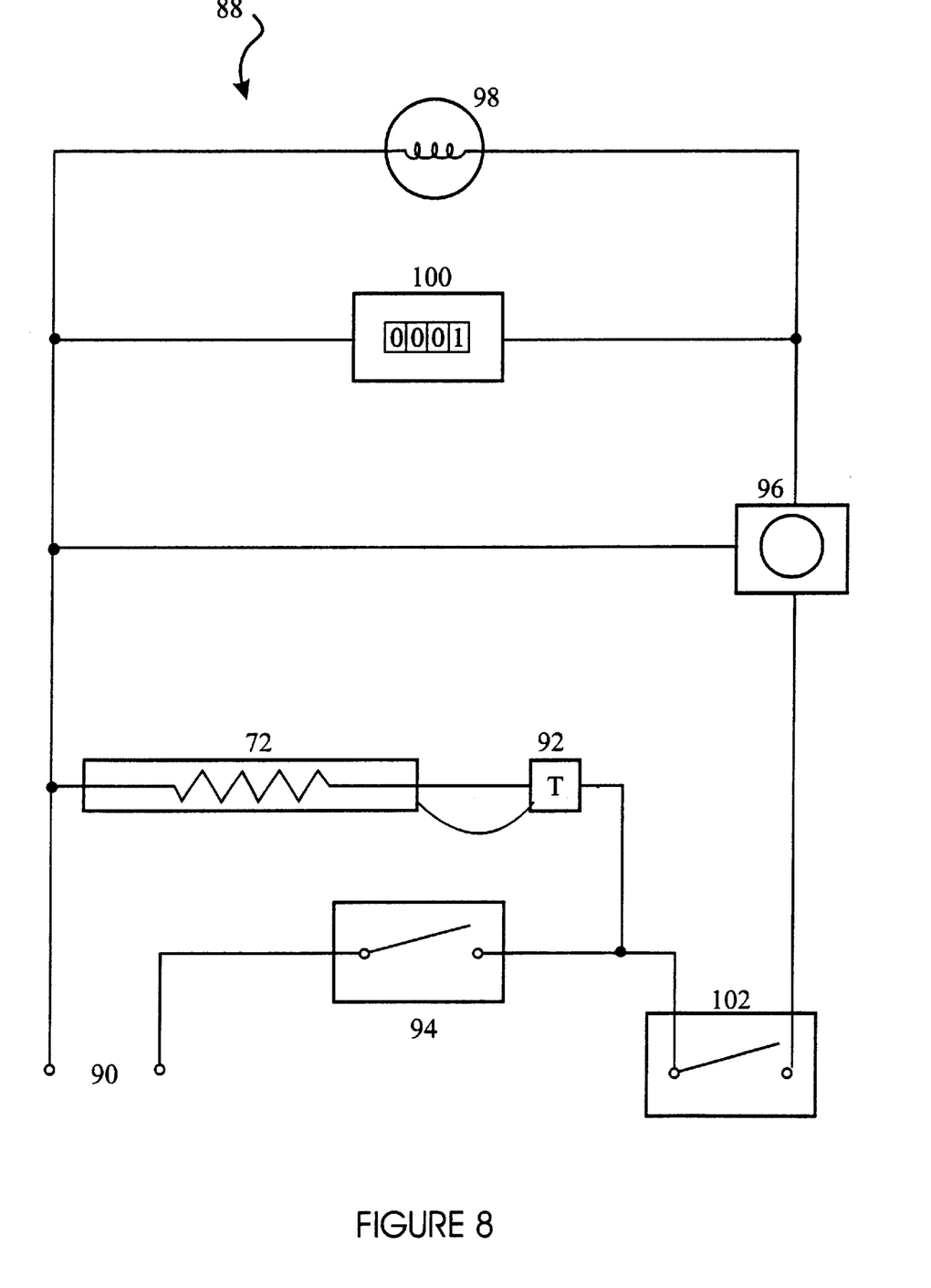
FIG. 8 is a block diagram of a preferred Control Circuit of the present invention.

Now turning to FIG. 8, one might better understand the preferred control circuit 88 of the present invention. As shown, the heating coils 72 are connected in series with a 120 VAC power source 90, an adjustable thermostat 92, and the main switch 94. In this manner, the heating coils may be activated by closing the main switch 94.

The press (see FIG. 3) is activated by a circuit comprising a timer 96 connected in series with a solenoid valve 98 and counter 100 that are connected to each other in parallel. The solenoid valve 98 is normally closed, and when opened, permits supply air to flow to the press (see FIG. 3), which causes the shaft (see FIG. 3) to be extended, causing the heating plate assembly (see FIG. 3) to travel downward. When this circuit is activated, the timer 96 will provide current to the solenoid valve 98 and counter 100 circuit for an adjustable time period, which corresponds to the "dwell time", or the time that the user desires for the heating plate assembly (see FIG. 3) to be pressed against the items being sealed. The timer 96 is activated by a foot switch 102 that is connected in series to it and the power source 90 and main switch 94. All a user needs to do, therefore, is depress the foot switch 102; when the dwell time expires, the press will retract, allowing the turntable (see FIGS. 1, 2 and 3) to be advanced to the next nesting tray of items to be sealed. Other control circuits 88 may be used, such as to include safety checks or other parameters and adjustments, including the ability to interface with presses (see FIG. 3) that operate on other than compressed air.

Figure 9:
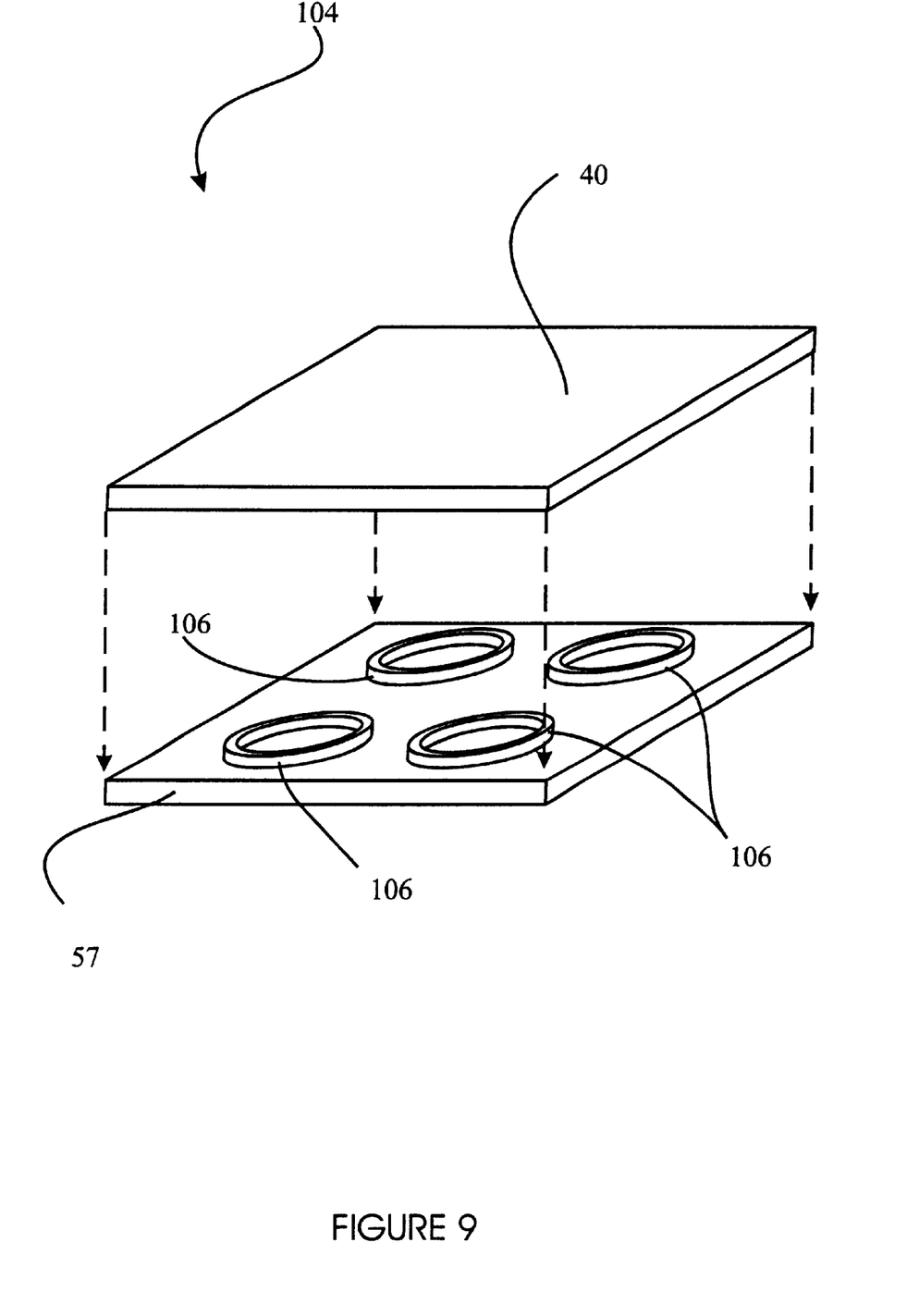
FIG. 9 is a partial perspective view of another preferred embodiment of the present invention wherein clamshell packages may be formed.

If we now turn to FIG. 9, we can examine yet another embodiment of the present invention. FIG. 9 is a partial perspective view of another preferred embodiment 104 of the present invention wherein clamshell packages may be sealed. In this embodiment 104, the alternate nesting tray 57 comprises a plurality of sealing ridges 106 disposed around the surface. The sealing ridges 106 are configured to provide a metal edge upon which the articles to be sealed can be placed. When the conventional heating plate assembly 40 is then pressed onto the sealing ridges 106, the upper plastic top of the package can actually be bonded to another piece of plastic or a plastic bottom. The result is what's known as a sealed clamshell package, or a plastic to plastic bond. The prior means for accomplishing this plastic to plastic bond was through RF sealing or UV activated glue, and where impulse sealers were used it was only for very thin materials. With the improved design 104, conventional blister-type plastic materials can be sealed to one another quickly and cheaply. If we now turn to FIG. 10 we can examine another preferred embodiment of the present invention.

Figure 10:
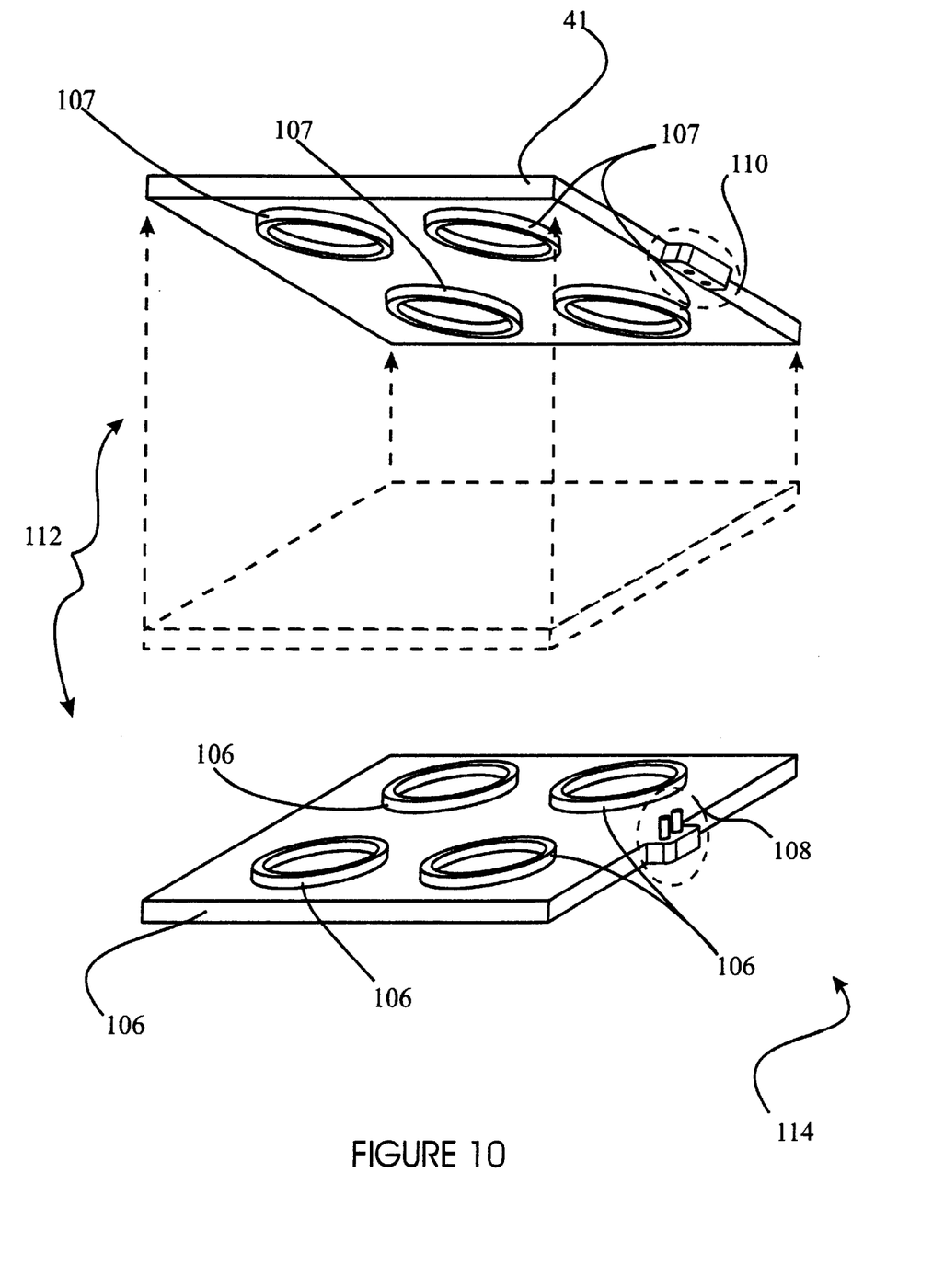
FIG. 10 is a partial perspective view of an alternate embodiment of the blister packaging device of FIG. 9.

As indicated by FIG. 10, there are other possible embodiments for this clamshell sealing device. FIG. 10 is a partial perspective view of an alternate embodiment of the blister packaging device of FIG. 9. FIG. 10 depicts an alternate improved clamshell packaging device 112 that embodies a part-time heating mechanism. As can be seen here, an alternate nesting tray 114 is defined by a plurality of sealing ridges 106, however it further includes a plug assembly 108. This plug assembly might be in a variety of designs in order to provide electricity to an external device placed in electrical contact with this plug assembly 108. As can be seen, the alternate heating plate assembly 41 has a reciprocal receptacle assembly 110 for cooperating with the plug assembly 108 such that when the heating plate assembly 41 is pressed onto the alternate nesting tray 114, electrical power is supplied to the alternate sealing ridges 107 which will result in their being heated. As can be appreciated, when the receptacle 110 loses contact with the plug assembly 108 (such as when the heating plate assembly 41 is lifted away from the nesting tray 114), the sealing ridges 107 will cool. This intermittent heating provides at least two benefits, one being safety aspect of not having a continuously heated device, and further the economic effect of only heating the ridge 107 when the heat is needed. As can be appreciated, since a fairly small surface area is involved when the sealing ridges 106 and 107 press one another, much less heat and pressure is needed in order to make the seal. As a result, thicker plastics can be used and need only be heated for a short time.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A collapsible rotary sealer for sealing packages, comprising;
    a frame;
    a plurality of legs extending downwardly from said frame;
    a turntable for receiving the packages to be sealed, said turntable comprising a plurality of nesting tray receiver members and a plurality of handles linking together adjacent said nesting tray receiver members, said turntable attachable to said frame and rotatable about a substantially vertical axis;
    a center panel defined by a periphery, said nesting tray receiver members extending outwardly therefrom, said nesting tray receiving members further comprising at least one sealing ridge;
    a press, attached to said frame and further defined by a moveable shaft having a distal end;
    a spindle, attached between said frame and said center panel to allow said center panel to rotate relative to said frame;
    an indexing means, attached to said spindle, for releasibly restraining said center panel from rotating at predetermined angular locations; and
    a heating plate assembly attached to said distal end, whereby the portion of each package aligned with each said sealing ridge is sealed when said press biases said heating plate assembly onto the packages for a sufficient time.

2. The sealer of claim 1, wherein said heating plate is further defined by at least one sealing ridge, said sealing ridges configured to cooperate with said nesting tray sealing ridges to seal said portion of each package aligned with said sealing ridges.

3. The sealer of claim 2, wherein:
    each said nesting tray is defined by a plug assembly; and
    said heating plate is further defined by a receptacle assembly for establishing electrical contact with said plug assembly, whereafter said heating plate sealing ridges become heated.

4. The sealer of claim 1, wherein said legs are detachable from said frame.

5. The sealer of claim 4, wherein said heating plate assembly comprises:
   a base plate, attached to said distal end of said press shaft;
   an insulating layer;
   a heating element; and
   an outer plate.

6. The sealer of claim 5, wherein said heating plate assembly further comprises:
   a reflective layer between said base plate and said insulating layer; and
   a shield attached to said outer plate opposite said heating element.

7. The sealer of claim 6, wherein said frame and said legs are made substantially entirely from tubing.

8. The sealer of claim 7, wherein said nesting tray receivers are removeably attached to said center panel.

9. The sealer of claim 8, wherein said indexing means further comprises:
   an indexing disc, attached to said center panel and rotatable around said spindle, said disc having a substantially circular periphery further defined by a plurality of depressions formed thereon;
   a roller cam, attached to said frame, said cam biased towards said periphery of said indexing disc and cooperating with said depressions, whereby each time said cam lines up with one said depression, said indexing disc and, consequently, said turntable will be restrained from rotation.

10. The sealer of claim 9, wherein said turntable further comprises four said nesting tray receiver members and four said handles, and:
    said center panel is further defined by a center panel frame having a first surface and a sheet attached to said first surface;
    each said nesting tray receiver member comprises a "C"-shape having an outer member defined by ends and two side members, each said side member extending inwardly from one of said ends and removably attached to said center panel frame in the same spatial plane as said center panel frame; and
    each said handle extends between side members of adjacent said nesting tray receivers.

11. The sealer of claim 10, wherein:
    said frame further comprises:
       a base portion;
       a back portion extending from said base portion;
       a top portion extending from said back portion, said top portion in substantially parallel alignment with said base portion; and
       a strut member extending from said base portion to said top portion; and
    said turntable is further defined by a center aperture through which said strut member extends.

12. A collapsible rotary sealer for blister-sealing packages, comprising:
    a frame;
    a plurality of legs extending downwardly from said frame;
    a turntable for receiving the packages to be sealed, said turntable attachable to said frame and rotatable about a substantially vertical axis and further comprising:
       a center panel defined by a periphery;
       a spindle, attached between said frame and said center panel to allow said center panel to rotate relative to said frame;
       a plurality of nesting tray receiver members extending outwardly from said center panel
       at least one nesting tray defined by a nesting tray sealing ridge, one said tray received by one said receiver member;
       a plurality of handles linking together adjacent said nesting tray receivers; and
       an indexing means, attached to said spindle, for releasibly restraining said center panel from rotating at predetermined angular locations;
    a press, attached to said frame and further defined by a moveable shaft having a distal end; and
    a heating plate assembly attached to said distal end further defined by at least one intermittantly heated sealing ridge, each said heated sealing ridge cooperatively configured to align with one said nesting tray sealing ridge, whereby the packages are sealed when said press biases said sealing ridges onto the packages for a sufficient time.

13. The sealer of claim 10, wherein said legs are detachable from said frame.

14. The sealer of claim 13, wherein said nesting tray receivers are removeably attached to said center panel.

15. The sealer of claim 14, wherein said indexing means further comprises:
    an indexing disc, attached to said center panel and rotatable around said spindle, said disc having a substantially circular periphery further defined by a plurality of depressions formed thereon;
    a roller cam, attached to said frame, said cam biased towards said periphery of said indexing disc and cooperating with said depressions, whereby each time said cam lines up with one said depression, said indexing disc and, consequently, said turntable will be restrained from rotation.

16. The sealer of claim 15, wherein said turntable further comprises four said nesting tray receiver members and four said handles, and:
    said center panel is further defined by a center panel frame having a first surface and a substantially rectangular sheet attached to said first surface;
    each said nesting tray receiver member comprises a "C"-shape having an outer member defined by ends and two side members, each said side member extending inwardly from one of said ends and removably attached to said center panel frame in the same spatial plane as said center panel frame; and
    each said handle extends between side members of adjacent said nesting tray receivers.

17. An apparatus for bonding plastic blister packages, said blister packages defined by plastic blister tops and plastic blister backs held by nesting trays, comprising:
    a frame made substantially entirely from tubing, said frame comprising:
       a horizontal base;
       a substantially vertical back extending upwardly from said base; and
       a top portion extending horizontally from said back portion, above and parallel to said base and further defined by a bottom side;
    a plurality of legs made substantially entirely from tubing of circular cross-section, said legs extending downwardly and removeably attachable to said frame;
    a turntable made substantially entirely from tubing, said turntable attachable to said frame and rotatable thereon about a substantially vertical axis and further defined by a plurality of nesting tray receivers for receiving the nesting trays each said nesting tray comprising at least one sealing ridge;

a press assembly, attached to said bottom side of said top portion, said press assembly further comprising a substantially vertical extendible shaft having a lower distal end, whereby said lower distal end may be pressed downwardly by extending said shaft; and a heating plate assembly attached to said lower distal end of said press, whereby when said shaft is extended, said heating plate assembly will be biased towards the vicinity of one of said nesting trays held in one of said nesting tray receivers.

18. The apparatus of claim 17, wherein said heating plate assembly is further defined by at least one heatable sealing ridge configured to cooperate with said nesting tray sealing ridge for bonding said plastic top with said plastic bottom when said heating plate assembly is biased towards said nesting trays.

* * * * *